(12) United States Patent
Moyers

(10) Patent No.: US 12,392,365 B1
(45) Date of Patent: Aug. 19, 2025

(54) VACUUM ASSISTED LINE BLEEDING

(71) Applicant: Richard K. Moyers, Morristown, TN (US)

(72) Inventor: Richard K. Moyers, Morristown, TN (US)

( * ) Notice: Subject to any disclaimer, the term of this patent is extended or adjusted under 35 U.S.C. 154(b) by 0 days.

(21) Appl. No.: 18/747,811

(22) Filed: Jun. 19, 2024

(51) Int. Cl.
| | |
|---|---|
| F15B 21/044 | (2019.01) |
| B60T 17/22 | (2006.01) |
| F15B 1/26 | (2006.01) |
| F15B 13/02 | (2006.01) |
| F16K 15/18 | (2006.01) |

(52) U.S. Cl.
CPC .......... *F15B 21/044* (2013.01); *B60T 17/222* (2013.01); *F15B 1/26* (2013.01); *F15B 13/027* (2013.01); *F16K 15/18* (2013.01)

(58) Field of Classification Search
CPC ........ F15B 21/044; F15B 1/26; F15B 13/027; B60T 17/222; F16K 15/18; F16K 51/10
USPC ........................ 137/12, 614.17; 251/352, 148
See application file for complete search history.

(56) References Cited

U.S. PATENT DOCUMENTS

| | | | | | |
|---|---|---|---|---|---|
| 2,069,606 | A | * | 2/1937 | Gary ...................... | B60T 17/222 137/543.17 |
| 2,645,314 | A | * | 7/1953 | Lackinger ............. | B60T 17/222 16/349 |
| 2,771,093 | A | * | 11/1956 | Wilson .................. | F15B 21/044 137/543.17 |
| 4,149,560 | A | * | 4/1979 | Berg ...................... | F16K 15/026 251/150 |
| 4,415,071 | A | * | 11/1983 | Butler ................... | B60T 17/222 188/352 |
| 4,479,511 | A | * | 10/1984 | Holland .................. | B60T 11/30 137/614 |
| 4,497,176 | A | * | 2/1985 | Rubin ................... | B60T 17/222 188/352 |
| 4,655,328 | A | * | 4/1987 | Tideberg ............... | B60T 17/222 188/352 |
| 4,989,639 | A | * | 2/1991 | Sulwer .................. | F16K 15/044 188/352 |
| 5,088,529 | A | * | 2/1992 | Jones ..................... | B60T 17/222 141/59 |
| 5,211,200 | A | * | 5/1993 | Cassidy .................. | F16K 24/04 137/183 |
| 5,653,316 | A | * | 8/1997 | Kane ..................... | B60T 17/222 188/352 |
| 5,816,281 | A | * | 10/1998 | Mixon .................. | B60T 17/222 188/352 |

(Continued)

*Primary Examiner* — Minh Q Le
(74) *Attorney, Agent, or Firm* — TechnicalAttorney; Rick Barnes

(57) ABSTRACT

A bleeder system having a check valve selectively enables or inhibits fluid communication. A first tube provides fluid communication between the check valve and a bleeder valve of a hydraulic system. A fluid recovery reservoir receives at least one of air and hydraulic fluid, with a second tube connected between the check valve and the fluid recovery reservoir to provide fluid communication between the check valve and the fluid recovery reservoir. A vacuum pump selectively draws a vacuum, with a third tube connected between the vacuum pump and the fluid recovery reservoir to provide the vacuum from the vacuum pump to the fluid recovery reservoir. A power source provides power to the vacuum pump.

6 Claims, 2 Drawing Sheets

(56) References Cited

U.S. PATENT DOCUMENTS

| | | | | |
|---|---|---|---|---|
| 6,189,319 B1* | 2/2001 | Petty | ............. | F15B 21/044 |
| | | | | 60/584 |
| 6,196,364 B1* | 3/2001 | Fouts | ............. | B60T 17/222 |
| | | | | 137/614.19 |
| 6,669,169 B2* | 12/2003 | Cornolti | ............. | B60T 17/222 |
| | | | | 251/149.6 |
| 11,383,690 B2* | 7/2022 | Tutor | ............. | B25B 13/06 |
| 2003/0094591 A1* | 5/2003 | Rafko | ............. | B60T 17/222 |
| | | | | 251/346 |
| 2009/0199707 A1* | 8/2009 | Kollmeier | ............. | B62D 5/062 |
| | | | | 92/163 |
| 2011/0253252 A1* | 10/2011 | Buchanan | ............. | B60T 17/222 |
| | | | | 141/69 |
| 2013/0092266 A1* | 4/2013 | Dhuri | ............. | F15B 21/044 |
| | | | | 137/561 R |
| 2017/0241558 A1* | 8/2017 | Mande | ............. | G01M 3/2807 |

* cited by examiner

VACUUM ASSISTED LINE BLEEDING

FIELD

This invention relates to the field of pressurized fluid systems. More particularly, this invention relates to bleeding air from a fluid line.

INTRODUCTION

Fluid-driven systems, such as brake lines, hydraulic lines, and so forth, operate by putting a relatively non-compressible fluid under pressure, such as with a pump of some kind, and conducting the pressurized fluid through hoses to where a desired operation is to be performed, such as moving a piston. The entire system is preferably kept in a closed state, or in other words, in a state where a compressible fluid-such as air-cannot get into the system. If air infiltrates the closed system, then the air tends to compress before the desired operation can be accomplished, which might require more force than remains after the air is compressed.

Removing air from the fluid system is a process that typically needs to be accomplished both when the system is first charged with fluid, or anytime the sealed system is opened to the atmosphere, such that air can get into the system. This is typically referred to as bleeding the system. It is a relatively simple process, but can be quite cumbersome and time consuming, and require several people to perform.

For example, a typical method might require one person to operate the pressurizing pump so as to move the fluid from a fluid reservoir to the hoses, another person to keep the fluid reservoir filled so that it doesn't empty and begin to aspirate air, and yet another person to open and close a so-called bleeder valve at the operative end of the system, such as at the piston. The bleeder valve is initially opened so that the air in the system can be pushed out, and then the bleeder valve is closed once the fluid starts to come out of the hose, and no more air bubbles are entrained in the stream of fluid.

In systems that are manually pumped, such as car brakes, the bleeder valve must be opened upon every pressurizing stroke, and then closed before each recovery stroke, so that the recovery of the brake pedal doesn't just pull the fluid back toward the reservoir. This process of pumping and recovering, and opening and closing the bleeder valve, is cyclically repeated until the system is discharged of air.

What is needed, therefore, is a system for bleeding a fluid-driven system that tends to reduce, at least in part, issues such as those suggested above.

SUMMARY

The above and other needs are met by a bleeder system having a check valve to selectively enable or inhibit fluid communication. A first tube provides fluid communication between the check valve and a bleeder valve of a hydraulic system. A fluid recovery reservoir receives at least one of air and hydraulic fluid, with a second tube connected between the check valve and the fluid recovery reservoir to provide fluid communication between the check valve and the fluid recovery reservoir. A vacuum pump selectively draws a vacuum, with a third tube connected between the vacuum pump and the fluid recovery reservoir to provide the vacuum from the vacuum pump to the fluid recovery reservoir. A power source provides power to the vacuum pump.

In some embodiments according to this aspect of the disclosure, the power source is at least one of a power cord adapted to plug into a standard alternating current outlet, a jack adapted to plug into a cigarette-lighter type receptacle in a car, clips adapted to attach to posts of a car battery, and a battery.

According to another aspect of the disclosure, there is described a method for bleeding a hydraulic system using the apparatus of claim 1, by connecting the first tube between the check valve and the bleeder valve, starting the vacuum pump, opening the check valve, opening the bleeder valve, monitoring the second tube for air entrainment in the hydraulic fluid, and when no air entrainment is seen in the hydraulic fluid, closing the bleeder valve and closing the check valve.

In some embodiments according to this aspect of the disclosure, the check valve is closed prior to closing the bleeder valve. In some embodiments, the bleeder valve is opened prior to opening the check valve. In some embodiments, a fluid supply reservoir for the hydraulic system is maintained as needed in a filled capacity while the second tube is monitored for air entrainment.

BRIEF DESCRIPTION OF THE DRAWINGS

Further advantages are apparent by reference to the detailed description when considered in conjunction with the figures, which are not to scale so as to more clearly show the details, wherein like reference numbers indicate like elements throughout the several views, and wherein.

DESCRIPTION

With reference now to the drawings, there are depicted all of the claimed elements of the various embodiments, although all claimed embodiments might not be depicted in a single drawing. Thus, it is appreciated that not all embodiments include all of the elements as depicted, and that some embodiments include different combinations of the depicted elements. It is further appreciated that the various elements can all have many different configurations, and are not limited to just the configuration of a given element as depicted. As indicated above, the elements of the drawings as depicted are not to scale, even with respect one to another, and relative size or thickness of one element cannot be determined by the aspect ratios of that element or with reference to any dimension of another element.

Figure 1:
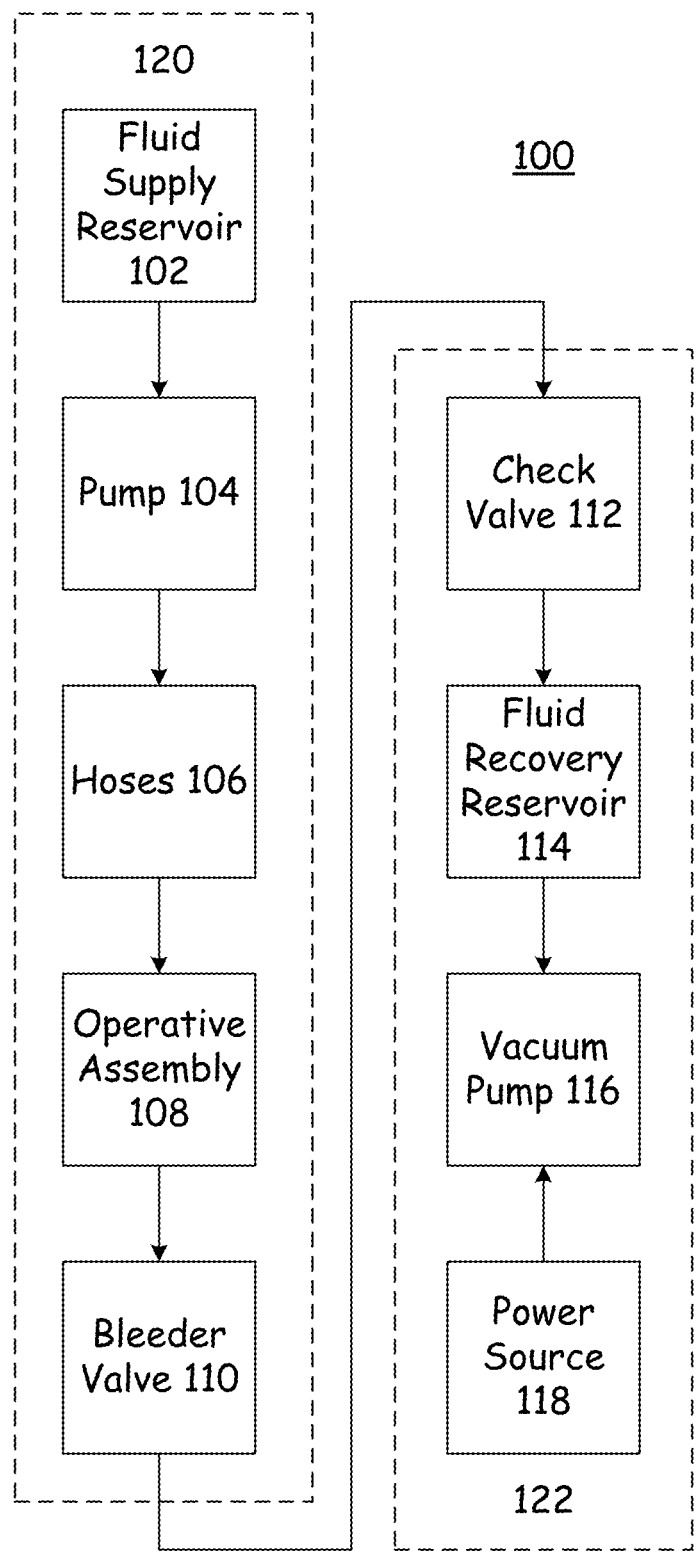
FIG. 1 is a functional block diagram of a system according to an embodiment of the present disclosure.

With reference now to FIG. 1, there is depicted one embodiment of a functional block diagram of the vacuum assisted line bleeding system 122 as connected to a fluid-driven hydraulic system 120. In this particular example, it is convenient to assume that the hydraulic system 120 is a braking system, such as for a car, so that specifics in regard to the process and apparatus can be described, which tends to make the application of the bleeding system 122 to other hydraulic systems 120 more clear as well.

This embodiment 100 depicts both the hydraulic system 120 and the bleeder system 122. It is understood that the hydraulic system 120 could have many different configurations, but a basic configuration is diagrammatically depicted as hydraulic system 120 in FIG. 1. In this embodiment, hydraulic system 120 includes a fluid supply reservoir 102, a pump 104, hoses 106 that connect the pump 104 to the operative assembly 108, and a bleeder valve 110. The hydraulic system 120 also includes, in some configurations, hoses or other such fluid conveyance means for the hydraulic fluid in the supply reservoir 102 to get to the pump 104.

In the example of a brake system for a car, the hydraulic system 120 includes a supply reservoir 102 that is typically disposed in the engine compartment under the hood of the car. The pumping system 104 typically includes a brake pedal that is operated by the driver from within the passenger compartment of the car, which brake pedal operates in association with a master cylinder to force the hydraulic fluid (in this example, brake fluid) through the hoses 106 (brake lines). The hoses 106 are connected to what has generically been referred to as an operative assembly 108, which in the example of car brakes includes at least one of a disk brake caliper or a drum brake caliper. Each such operative assembly 108 has a bleeder valve 110, which can be selectively opened or closed as desired, to either allow the hydraulic fluid to remain within the operative assemblies 108 or to allow the hydraulic fluid, and any air bubbles entrained therein, to flow out of the operative assemblies 108.

In the embodiment 100 as depicted, the bleeder valve 110 of the hydraulic system 120 is connected to the check valve 112 of the bleeder system 122, such as with a tube that is at least partially transparent, so that a visual inspection of the contents of the tube can be made. For example, in the embodiment as described herein, it is beneficial for the operator to be able to visually confirm if the tube between the bleeder valve 110 of the hydraulic system 120 and the check valve 112 of the bleeder system 122 contains a flow of air only, hydraulic fluid only, or a mixture of both air and hydraulic fluid.

The check valve 112 of the bleeder system 122 is connected to a fluid recovery reservoir 114, again such as by a tube, into which air, hydraulic fluid, and a combination thereof can flow. The fluid recovery reservoir 114 is in fluid communication with a vacuum pump 116, but in this case it is expected that no liquid would flow between the fluid recovery reservoir 114 and the vacuum pump 116. Instead, the vacuum pump 116 would draw a vacuum on the fluid recovery reservoir 114. By so doing, when both the check valve 112 and the bleeder valve 110 are open, the vacuum pump 116 will draw hydraulic fluid (and possibly some amount of entrained air) from the fluid supply reservoir 102, and through the other elements of the hydraulic system 120 as described above.

A power source 118 is connected to the vacuum pump 116, so as to provide power, such as electrical power, for the selective operation of the vacuum pump 116. In various embodiments, the power source 118 can be at least one of a power cord for plugging into a standard alternating current outlet, a jack for plugging into a cigarette-lighter type receptacle in a car, clips for attaching to the posts of a car battery, and one or more batteries, such as rechargeable batteries. Other types of power sources are also comprehended herein.

In some embodiments, all of the elements of the bleeder system 122 are provided as a portable kit, such as in a box with a handle, such as an ammo-type plastic box.

Figure 2:
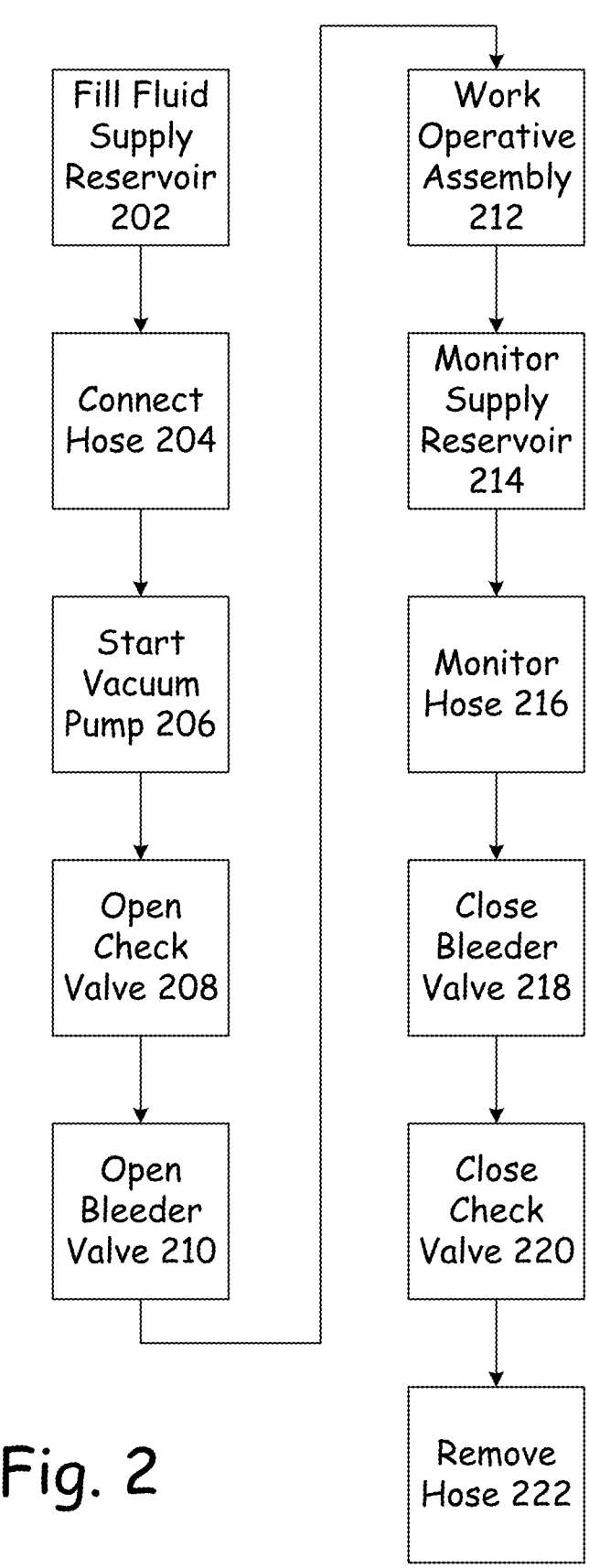
FIG. 2 is a flow chart of a method for using the system of FIG. 1, according to an embodiment of the present disclosure.

With reference now to FIG. 2, there is depicted a method 200 for one embodiment for the use and operation of the bleeder system 122, with continued reference to the example of a car braking system. As given in block 202, the fluid supply reservoir is filled to an appropriate level with the hydraulic fluid (brake fluid), and the bleeder valve 110 is connected with a tube to the check valve 112, as given in block 204. The vacuum pump 116 is then started, as given in block 206. The check valve 112 and the bleeder valve 110 are opened as given in blocks 208 and 210, which can be done in either order, meaning that either check valve 112 can be opened first or the bleeder valve 110 can be opened first.

In some embodiments, the operative assembly 108 needs to be worked to start the hydraulic fluid flowing through the hydraulic system 120 under the influence of the vacuum provided by the vacuum pump 116, as given in block 212. In other embodiments, the hydraulic fluid will begin flowing through the hydraulic system 120 as soon as the second of the check valve 112 and the bleeder valve 110 is opened.

At least one of the tube between the check valve 112 and the fluid recovery reservoir 114 and the fluid recovery reservoir 114 itself is monitored by the operator, as given in block 216. At some point, hydraulic fluid will be visible in the tube and then in the fluid recovery reservoir 114. At first, there is typically some amount of air present in the hydraulic fluid, which could manifest as either relatively larger gaps of air between plug-flows of hydraulic fluid or relatively smaller bubble of air entrained within the flow of hydraulic fluid. As more fluid flows into the fluid recovery reservoir 114, the degree of air entrainment will decrease, until such point that it disappears entirely, and the bleeding operation has been successful.

While this step 216 is occurring, the operator might want to also monitor the supply reservoir 102 to ensure that the supply reservoir 102 is not underflowing and aspirating air into the hydraulic system 120, as given in block 214. Additional hydraulic fluid can be added to the hydraulic system 120 in the supply reservoir 102 by the operator as needed or desired.

Once the operator determines that a successful bleed of the hydraulic system 120 has occurred, the bleeder valve 110 and the check valve 112 are closed, as given in blocks 218 and 220. As before, the order in which the bleeder valve 110 and the check valve 112 are closed is left to the operator, and either can be closed before the other, as desired.

The method 200 is completed by removing the hose between the bleeder valve 110 and the check valve 112, removing the bleeder system 122 from power, cleaning the hydraulic fluid from the various elements of the bleeder system 122 as desired, all as given in block 222 of the method 200. In one embodiment, the vacuum pump 116 is left running, the tube is disconnected at the bleeder valve 110, the check valve 112 is opened, and the hydraulic fluid within the tube is pulled into the fluid recovery reservoir 114 for reuse or disposal.

One of the benefits of the method and apparatus as described above is that only a single operator is needed to bleed the hydraulic system 120, by monitoring the level of hydraulic fluid in the supply reservoir 202 and the air entrainment of the hydraulic fluid in the hose or recovery reservoir 114.

In one embodiment, the apparatus comes as a self-contained kit with removable hardware, comprised of the following:

11.6 in (L)×5.1 in (W)×7.1 in (H) heavy gauge polypropylene housing (with handle) that is water resistant and lockable
    12 VDC mini vacuum pump mounted inside the housing
    AC/DC power plug
    120 VAC/12 VDC power supply
    On/Off switch
    Air vent grill cover (metal)
    Fluid shutoff switch (1) 12 or 16 oz fluid recovery bottle (with two caps)·
¼" hose barb (mounted to housing)·
Approximately 4.5 ft of ¼" clear PVC tubing As used herein, the phrase "at least one of A, B, and C" means all possible combinations of none or multiple instances of each of A, B, and C, but at least one A, or one B, or one C. For example, and without limitation: Ax1, Ax2+Bx1, Cx2, Ax1+Bx1+Cx1, Ax7+Bx12+Cx113. It does not mean Ax0+Bx0+Cx0.

The foregoing description of embodiments has been presented for purposes of illustration and description. It is not intended to be exhaustive or to limit the embodiments to the precise forms disclosed. Obvious modifications or variations are possible in light of the above teachings. The embodiments are chosen and described in an effort to provide illustrations of their principles and practical applications, and to thereby enable one of ordinary skill in the art to utilize the embodiments with various modifications as are suited to the particular use contemplated. All such modifications and variations are within the scope of the appended claims when interpreted in accordance with the breadth to which they are fairly, legally, and equitably entitled.

The invention claimed is:

1. A bleeder system comprising:
    a check valve adapted to selectively enable or inhibit fluid communication,
    a first tube adapted to provide fluid communication between the check valve and a bleeder valve of a hydraulic system,
    a fluid recovery reservoir adapted to receive at least one of air and hydraulic fluid,
    a second tube connected between the check valve and the fluid recovery reservoir and adapted to provide fluid communication between the check valve and the fluid recovery reservoir,
    a vacuum pump adapted to selectively draw a vacuum,
    a third tube connected between the vacuum pump and the fluid recovery reservoir and adapted to provide the vacuum from the vacuum pump to the fluid recovery reservoir, and
    a power source adapted to provide power to the vacuum pump.

2. The bleeder system of claim 1, wherein the power source is at least one of a power cord adapted to plug into a standard alternating current outlet, a jack adapted to plug into a cigarette-lighter type receptacle in a car, clips adapted to attach to posts of a car battery, and a battery.

3. A method for bleeding a hydraulic system using the apparatus of claim 1, the method comprising the steps of:
    connecting the first tube between the check valve and the bleeder valve,
    starting the vacuum pump,
    opening the check valve,
    opening the bleeder valve,
    monitoring the second tube for air entrainment in the hydraulic fluid,
    when no air entrainment is seen in the hydraulic fluid, closing the bleeder valve, and
    closing the check valve.

4. The method of claim 3, wherein the check valve is closed prior to closing the bleeder valve.

5. The method of claim 3, wherein the bleeder valve is opened prior to opening the check valve.

6. The method of claim 3, wherein a fluid supply reservoir for the hydraulic system is maintained as needed in a filled capacity while the second tube is monitored for air entrainment.

* * * * *